(12) United States Patent
Isshiki et al.

(10) Patent No.: US 12,523,603 B2
(45) Date of Patent: Jan. 13, 2026

(54) OPTICAL CONCENTRATION MEASURING APPARATUS

(71) Applicant: Asahi Kasei Microdevices Corporation, Tokyo (JP)

(72) Inventors: Shota Isshiki, Tokyo (JP); Takaaki Furuya, Tokyo (JP); Hans Martin, Delsbo (SE)

(73) Assignee: Asahi Kasei Microdevices Corporation, Tokyo (JP)

(*) Notice: Subject to any disclaimer, the term of this patent is extended or adjusted under 35 U.S.C. 154(b) by 163 days.

(21) Appl. No.: 18/596,622

(22) Filed: Mar. 6, 2024

(65) Prior Publication Data
US 2024/0310276 A1    Sep. 19, 2024

(30) Foreign Application Priority Data

Mar. 14, 2023 (JP) .................... 2023-040150
Jan. 23, 2024 (JP) .................... 2024-008185

(51) Int. Cl.
G01N 21/3504    (2014.01)

(52) U.S. Cl.
CPC . *G01N 21/3504* (2013.01); *G01N 2201/0636* (2013.01)

(58) Field of Classification Search
None
See application file for complete search history.

(56) References Cited

U.S. PATENT DOCUMENTS

| 2003/0134427 | A1  | 7/2003  | Roller et al. |
| 2003/0204327 | A1  | 10/2003 | Stedman et al. |
| 2005/0017206 | A1* | 1/2005  | Tice ................. G01N 15/06 250/573 |
| 2005/0092067 | A1* | 5/2005  | Petrovic ............ G01N 21/3504 250/338.5 |
| 2005/0280825 | A1  | 12/2005 | Oka et al. |
| 2007/0279633 | A1* | 12/2007 | Yi .................... G01N 21/61 356/432 |
| 2012/0290208 | A1* | 11/2012 | Jiang ............... G01N 21/552 250/269.1 |

(Continued)

FOREIGN PATENT DOCUMENTS

| JP | 2004500563 A | 1/2004 |
| JP | 2004309392 A | 11/2004 |

(Continued)

*Primary Examiner* — Edwin C Gunberg
(74) *Attorney, Agent, or Firm* — KENJA IP LAW PC

(57) ABSTRACT

An optical concentration measuring apparatus (1) that includes: a light emitter (3) on a main surface (20) of a substrate (2) that emits light from a light-emitting surface; a light receiver (4) on the main surface of the substrate that receives light at a light-receiving surface; and a light guide (5) that guides light emitted by the light emitter to the light receiver. The light guide includes a first reflector (51) and a second reflector (52) that are connected to the main surface of the substrate and are opposite each other in an overhead view of the main surface of the substrate. The second reflector includes two quadric surfaces. The first reflector includes a main reflective surface (53) that is a quadric surface and two secondary reflective surfaces (54) that are quadric surfaces and are integrally formed at portions of the main reflective surface.

9 Claims, 10 Drawing Sheets

(56) References Cited

U.S. PATENT DOCUMENTS

| | | | |
|---|---|---|---|
| 2015/0268158 A1* | 9/2015 | Laudo | G01N 33/0047 |
| | | | 250/349 |
| 2018/0347797 A1* | 12/2018 | Nicholas | G01J 3/0256 |
| 2019/0101487 A1 | 4/2019 | Shibuya et al. | |
| 2020/0386677 A1* | 12/2020 | Deliwala | G01J 3/0208 |
| 2022/0244241 A1* | 8/2022 | Ljungblad | G01N 30/74 |

FOREIGN PATENT DOCUMENTS

| JP | 2006003233 A | 1/2006 |
|---|---|---|
| JP | 2021144027 A | 9/2021 |
| JP | 2021148782 A | 9/2021 |
| JP | 2021162577 A | 10/2021 |
| JP | 2022079586 A | 5/2022 |

\* cited by examiner

OPTICAL CONCENTRATION MEASURING APPARATUS

CROSS-REFERENCE TO RELATED APPLICATION

The present application claims priority to and the benefit of Japanese Patent Application No. 2023-040150 filed on Mar. 14, 2023, and Japanese Patent Application No. 2024-008185 filed on Jan. 23, 2024, the entire contents of which are incorporated herein by reference.

TECHNICAL FIELD

The present disclosure relates to an optical concentration measuring apparatus.

BACKGROUND

For example, optical concentration measuring apparatus that detect gas concentrations are used in various fields. An optical concentration measuring apparatus includes, for example, in the same case, a light source that emits infrared rays and a detector that detects infrared rays of a specific wavelength. Gas to be detected is introduced into the case.

Here, in order to realize an optical concentration measuring apparatus that is compact and has high measurement accuracy, a multipass cell may be used, in which a pair of mirrors are disposed opposite each other and light is reflected multiple times between the mirrors. Even at the same size, the use of a multipass cell increases the optical path length. Therefore, the effect of disturbance may be reduced, and a compact optical concentration measuring apparatus that has high measurement accuracy may be realized. For example, Patent Literature (PTL) 1 describes a multipass cell configured so that light spots formed on reflective surfaces of a pair of mirrors are scattered over an elongated region of a defined width.

CITATION LIST

Patent Literature

PTL 1: JP 2022-079586 A

SUMMARY

Technical Problem

Here, the multipass cell described in PTL 1 uses a semiconductor laser as a light source. Accordingly, a light spot formed on a reflective surface is small in diameter. However, when the light source is, for example, an incoherent light source such as a light emitting diode (LED), light is emitted radially from the light source and a light spot spreads on a reflective surface. Therefore, use of the multipass cell of PTL 1, which assumes that the diameter of the light spot is small, is difficult. Accordingly, there is a need for an optical concentration measuring apparatus using a multipass cell that has a different structure that may be made more compact without compromising measurement accuracy.

In view of these points, it would be helpful to provide an optical concentration measuring apparatus that is compact and has high measurement accuracy.

Solution to Problem (1) An optical concentration measuring apparatus according to an embodiment of the present disclosure comprises:

a light emitter disposed on a main surface of a substrate and configured to emit light from a light-emitting surface;

a light receiver disposed on the main surface of the substrate and configured to receive the light at a light-receiving surface; and a light guide configured to guide the light emitted by the light emitter to the light receiver, wherein the light guide comprises a first reflector and a second reflector, the first reflector and the second reflector are connected to the main surface of the substrate opposite each other in an overhead view looking directly at the main surface of the substrate, the second reflector comprises two quadric surfaces, and the first reflector comprises a main reflective surface that is a quadric surface and two secondary reflective surfaces integrally formed at portions of the main reflective surface, where each of the secondary reflective surfaces is a quadric surface.

(2) The optical concentration measuring apparatus according to (1), as an embodiment of the present disclosure, is configured such that light spots occur on the main reflective surface in a lateral view looking from the second reflector to the front of the main reflective surface, rows are formed by the light spots that are adjacent to each other in a horizontal direction, and the rows are arranged in a vertical direction, and centers of the light spots in each adjacent different row of the light spots are all offset from each other in the horizontal direction.

(3) The optical concentration measuring apparatus according to (1) or (2), as an embodiment of the present disclosure, is configured such that a number of light spots on the main reflective surface is $((N/2)-1)$, where a total number of optical paths from the first reflective surface to the second reflective surface and from the second reflective surface to the first reflective surface is N.

(4) The optical concentration measuring apparatus according to (3), as an embodiment of the present disclosure, is configured such that the total number is 8 or more and a multiple of 4.

(5) The optical concentration measuring apparatus according to any one of (1) to (4), as an embodiment of the present disclosure, is configured such that in the overhead view, each axis of symmetry of the two secondary reflective surfaces is not parallel to an axis of symmetry of the main reflective surface.

(6) The optical concentration measuring apparatus according to any one of (1) to (5), as an embodiment of the present disclosure, is configured such that the main reflective surface is a spherical surface.

(7) The optical concentration measuring apparatus according to any one of (1) to (6), as an embodiment of the present disclosure, is configured such that light spots occur on the main reflective surface in a lateral view looking from the second reflector to the front of the main reflective surface, and overlap of the light spots that are adjacent is 20% or less of the total intensity of each light spot.

(8) The optical concentration measuring apparatus according to any one of (1) to (7), as an embodiment of the present disclosure, is configured such that light spots occur on the main reflective surface in a vertical direction and a horizontal direction in a lateral view looking from the second reflector to the front of the main reflective surface, and a distance D between each light spot satisfies D≤Lz/5 or D≤Lx/5, where Lz is length of the first reflector in the vertical direction and Lx is length of the first reflector in the horizontal direction.

(9) An optical concentration measuring apparatus according to an embodiment of the present disclosure comprises:

a light emitter configured to emit light from a light-emitting surface;

a light receiver configured to receive the light at a light-receiving surface; and a light guide configured to guide the light emitted by the light emitter to the light receiver, wherein the light guide comprises a first reflector and a second reflector, the first reflector and the second reflector are connected to a main surface of a substrate and are opposite each other in an overhead view looking directly at the main surface of the substrate, the second reflector comprises two quadric surfaces, the first reflector comprises a main reflective surface that is a quadric surface, and the light emitter and the light receiver are disposed opposite the second reflector in an overhead view looking directly at the main surface of the substrate.

Advantageous Effect

According to an embodiment of the present disclosure, an optical concentration measuring apparatus may be provided that is compact and has high measurement accuracy.

DETAILED DESCRIPTION

Figure 1:
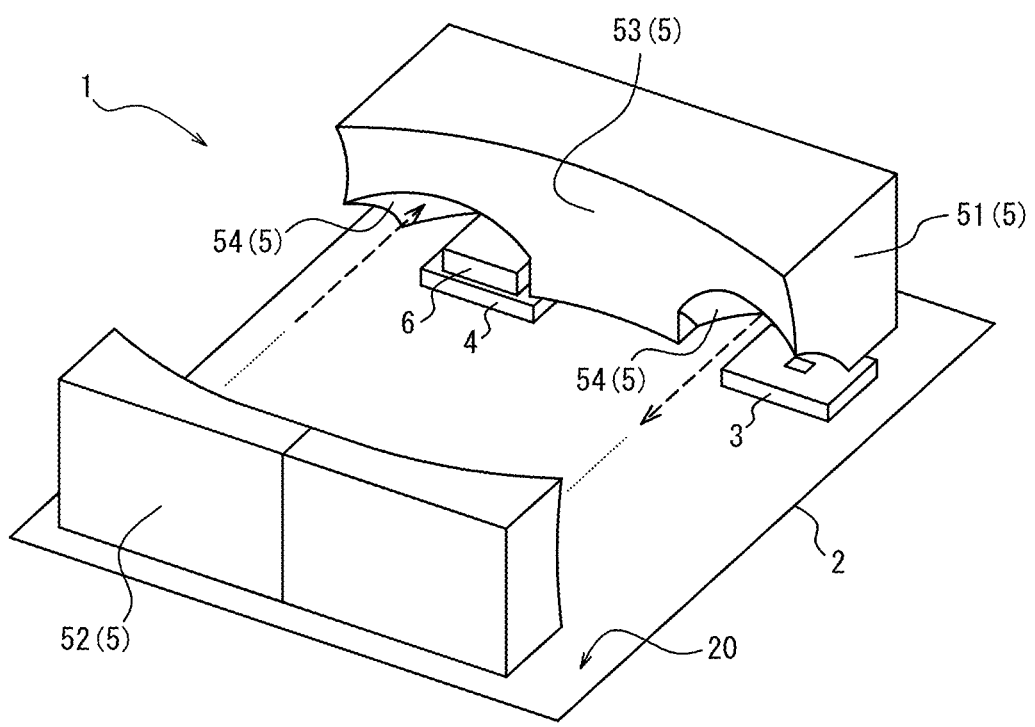
FIG. 1 is a partially transparent perspective diagram of an optical concentration measuring apparatus according to an embodiment of the present disclosure.
Figure 1:
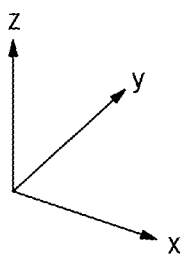

FIG. 1 is a partially transparent perspective diagram of an optical concentration measuring apparatus 1 according to an embodiment of the present disclosure. The optical concentration measuring apparatus 1 is a compact apparatus, 20 mm×10 mm×10 mm as an example, and is also referred to as a gas sensor. According to the present embodiment, the optical concentration measuring apparatus 1 is a non-dispersive infrared (NDIR) type device that measures the concentration of a gas to be detected based on infrared radiation transmitted through the gas that is introduced. The gas to be detected may be, for example, carbon dioxide, water vapor, methane, propane, formaldehyde, carbon monoxide, nitrogen monoxide, ammonia, sulfur dioxide, alcohol, or the like.

The optical concentration measuring apparatus 1 includes a light emitter 3, a light receiver 4, and a light guide 5. As per the present embodiment, the optical concentration measuring apparatus 1 may further include a substrate 2 and an optical filter 6. FIG. 1 illustrates an example configuration of the optical concentration measuring apparatus 1 with a portion of the light guide 5 made transparent, and the light emitter 3, the light receiver 4, and the optical filter 6 on a main surface 20 of the substrate 2 visible. According to the present embodiment, the main surface 20 is the surface with the largest area of the substrate 2 on which the light guide 5 is disposed.

Hereinafter, as illustrated in FIG. 1, Cartesian coordinates are set so that the xy-plane is parallel to the main surface 20 of the substrate 2. The Cartesian coordinates are commonly used in FIG. 2 to FIG. 9. The z-axis direction is perpendicular to the main surface 20 of the substrate 2. The z-axis direction may also be referred to as the vertical direction. Further, the positive direction of the z-axis is considered an upward direction. The x-axis direction and the y-axis direction are parallel to sides of the main surface 20 of the substrate 2. Hereinafter, the view of the front of the main surface 20 of the substrate 2 may also be referred to as the overhead view. The viewing direction in the case of the overhead view corresponds to the negative direction of the z-axis.

The substrate 2 is a board-like member that mounts components of the optical concentration measuring apparatus 1 and makes electrical connections for mounted electronic components. The substrate 2 has the light emitter 3, the light receiver 4, and the light guide 5 mounted on the main surface 20. The substrate 2 may also have the optical filter 6 mounted on the main surface 20. The substrate 2 may further mount other electronic components. For example, the substrate 2 may be provided with a controller that controls at least one of the light emitter 3 or the light receiver 4 on the main surface 20 or on a bottom surface that is the opposite side to the main surface 20. Further, the substrate 2 may be provided with an arithmetic unit on the main surface 20 or on the bottom surface to execute arithmetic operations in gas concentration calculation. The arithmetic unit may include at least one general-purpose processor that executes functions according to a program to be read and may include at least one dedicated processor specialized for a particular process. The dedicated processor may include an application specific integrated circuit (ASIC). The arithmetic unit may be integrated with the controller described above.

The light emitter 3 is a component that emits light used to detect the gas to be detected. The light emitter 3 is not particularly limited as long as the light emitter 3 outputs light including a wavelength that is absorbed by the gas to be detected. According to the present embodiment, the light emitted by the light emitter 3 is infrared light, but is not limited to this example. According to the present embodiment, the light emitter 3 is an LED that emits light from a light-emitting surface. The light-emitting surface is a surface of the light emitter 3 that is in contact with the gas and is made of an optically transparent material. As another example, the light emitter 3 may be a micro-electromechanical systems (MEMS) heater or the like. The light emitter 3 is disposed on the main surface 20 of the substrate 2, opposite one of the secondary reflective surfaces 54, described below.

The light receiver 4 is a component that receives light transmitted through the gas that is introduced. The light receiver 4 is not particularly limited as long as the light receiver 4 is sensitive to a band of light that includes a wavelength absorbed by the gas to be detected. According to the present embodiment, light received by the light receiver 4 is infrared light, but is not limited to this example. According to the present embodiment, the light receiver 4 is a photodiode that receives light at a light-receiving surface. Further, the light-receiving surface is a surface of the light receiver 4 that is in contact with the gas and is made of an optically transparent material. As other examples, the light receiver 4 may be a phototransistor or thermopile, a pyroelectric sensor, a bolometer, or the like. The light receiver 4 converts received light into an electrical signal and outputs the converted electrical signal. The electrical signal is output to, for example, an arithmetic unit. Upon receiving the electrical signal, the arithmetic unit calculates the concentration of the gas to be detected, based on light transmittance and the like. The light receiver 4 is disposed on the main surface 20 of the substrate 2, opposite the another one of the secondary reflective surfaces 54, described below.

According to the present embodiment, the light receiver 4 includes the optical filter 6 that has a wavelength selection function. The optical filter 6 transmits light emitted from the light emitter 3 and reflected by the light guide 5 to reach the light-receiving surface of the light receiver 4. Here, the optical filter 6 need only be provided on the optical path and need not be included in the light receiver 4. Further, the optical concentration measuring apparatus 1 may be configured without the optical filter 6.

The light guide 5 is a guide that guides light emitted by the light emitter 3 to the light receiver 4. The light guide 5 is an optical system of the optical concentration measuring apparatus 1. The light guide 5 includes optical members and configures the optical path from the light emitter 3 to the light receiver 4. In other words, the light guide 5 optically connects the light emitter 3 and the light receiver 4. Here, the optical members are, for example, mirrors, lenses, and the like.

According to the present embodiment, the light guide 5 includes a first reflector 51 and a second reflector 52. As illustrated in FIG. 1, the first reflector 51 and the second reflectors 52 are connected to the main surface 20 of the substrate 2 and are opposite each other in the overhead view. Further, the first reflector 51 and the second reflector 52 may be held in a structure that has a function of holding the relative positions of the first reflector 51 and the second reflector 52, and the structure may be in the form of a connection to the main surface 20 of the substrate 2.

Figure 2:
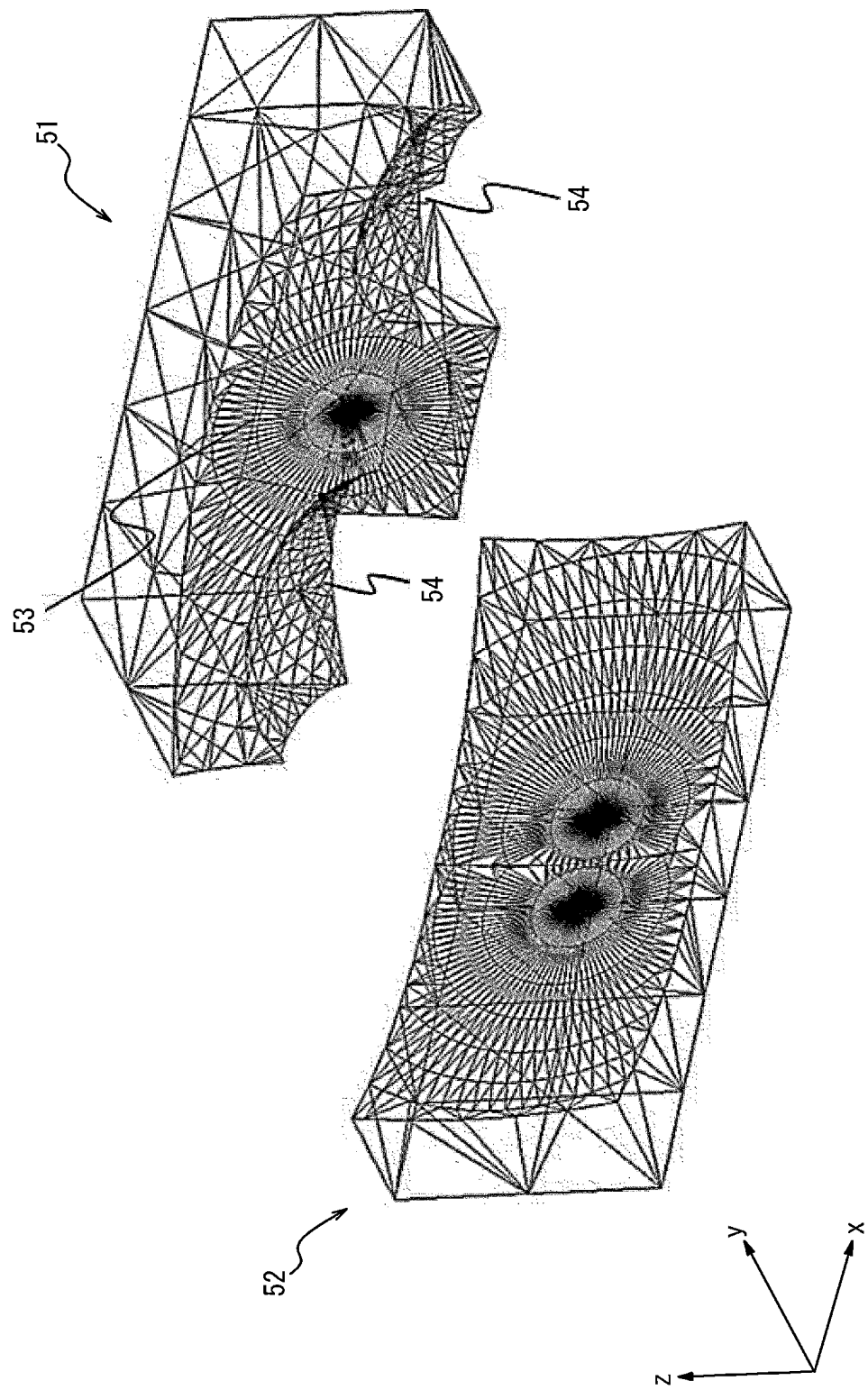
FIG. 2 is a diagram for explanation of shapes of a first reflector and a second reflector.

FIG. 2 is a diagram for explanation of shapes of the first reflector 51 and the second reflector 52. FIG. 2 illustrates the first reflector 51 and the second reflector 52 extracted from the optical concentration measuring apparatus 1 in FIG. 1, and illustrates shapes of surfaces. The first reflector 51 is configured to have a main reflective surface 53 that is a quadric surface, and two secondary reflective surfaces 54 that are each quadric surfaces. The main reflective surface 53 is preferably a spherical surface, as per the present embodiment. The secondary reflective surfaces 54 are formed integrally with a portion of the main reflective surface 53, and are formed as cut out portions from the main reflective surface 53 in the example of FIG. 2. Here, quadric surfaces may include, for example, parabolic, ellipsoidal, spherical surfaces, and the like, and may have rotational axis symmetry. The second reflector 52 is configured to have two quadric surfaces. For example, the second reflector 52 may be configured to have two spherical surfaces joined together at a reflective surface opposite the first reflector 51. By forming the secondary reflective surfaces 54 as cut out portions from the main reflective surface 53, the first reflector 51 has the following three functions in a single structure. The first function is a function of deflecting light emitted from the light emitter 3 in a direction perpendicular to the main surface 20 of the substrate 2 to a direction parallel to the main surface 20 of the substrate 2. The second function is a function of multiple reflections between the first reflector 51 and the second reflector 52. The third function is a function of deflecting light that is parallel to the main surface 20 of the substrate 2 to the light receiver 4, which is perpendicular to the main surface 20 of the substrate 2. Further, by forming the secondary reflective surfaces 54 as cut out portions from the main reflective surface 53, relative angular misalignment does not occur between the secondary reflective surfaces 54 and the main reflective surface 53 during thermal expansion of the first reflector 51. Further, the secondary reflective surfaces 54 and the main reflective surface 53 are connected without any additional connecting structure, and the portion of the main reflective surface 53 that remains after the secondary reflective surfaces 54 are cut from the main reflective surface 53 may be used for multiple reflections of light. Therefore, the reflective surface of the first reflector 51 may be used as effectively as possible, and as a result, the optical concentration measuring apparatus 1 may be made more compact without reducing measurement accuracy.

Referring again to FIG. 1, one of the secondary reflective surfaces 54 near the light emitter 3 reflects light emitted from the light emitter 3. The light reflected by the one of the secondary reflective surfaces 54 is reflected by the second reflector 52 and the main reflective surface 53 to traverse back and forth between the second reflector 52 and the main reflective surface 53 multiple times. The optical path is configured to traverse through a cell (internal space) between the light guide 5 and the substrate 2, where gas is introduced. Specific examples of the optical path between the second reflector 52 and the main reflective surface 53 are described below. The other one of the secondary reflective surfaces 54 near the light receiver 4 reflects light from the second reflector 52 and guides the light to the light receiver 4. Here, the light guide 5 may be configured to include a lens in a portion of the optical path. The one of the secondary reflective surfaces 54 near the light emitter 3 and the other one of the secondary reflective surfaces 54 near the light receiver 4 are both quadric surfaces, but need not be the same curved surface.

Material of the main reflective surface 53 and the secondary reflective surfaces 54 of the first reflector 51 and the reflective surface of the second reflector 52 may be, but is not limited to, metal, glass, ceramic, stainless steel, and the like. From the viewpoint of improving detection sensitivity, the material of these mirrors is preferably a material that has a low light absorption coefficient and high reflectance. Specifically, a resin housing coated with an alloy containing aluminum, gold, or silver, a dielectric, or a laminate thereof is preferred. From the viewpoint of reliability and aging, a resin housing coated with gold or an alloy layer containing gold is preferred. Further, forming a dielectric laminate on the surface of the metal layer to increase reflectance and avoid degradation over time is preferred. Vapor deposition or coating applied to a resin housing may provide improved productivity and lighter weight compared to forming with a metal material. Further, a difference in thermal expansion coefficient from the substrate 2 is reduced, thermal deformation is suppressed, and sensitivity fluctuation is suppressed. Further, the light guide 5 may be formed by cutting. From the viewpoint of productivity, the light guide 5 being formed by injection molding is desirable.

Figure 3:
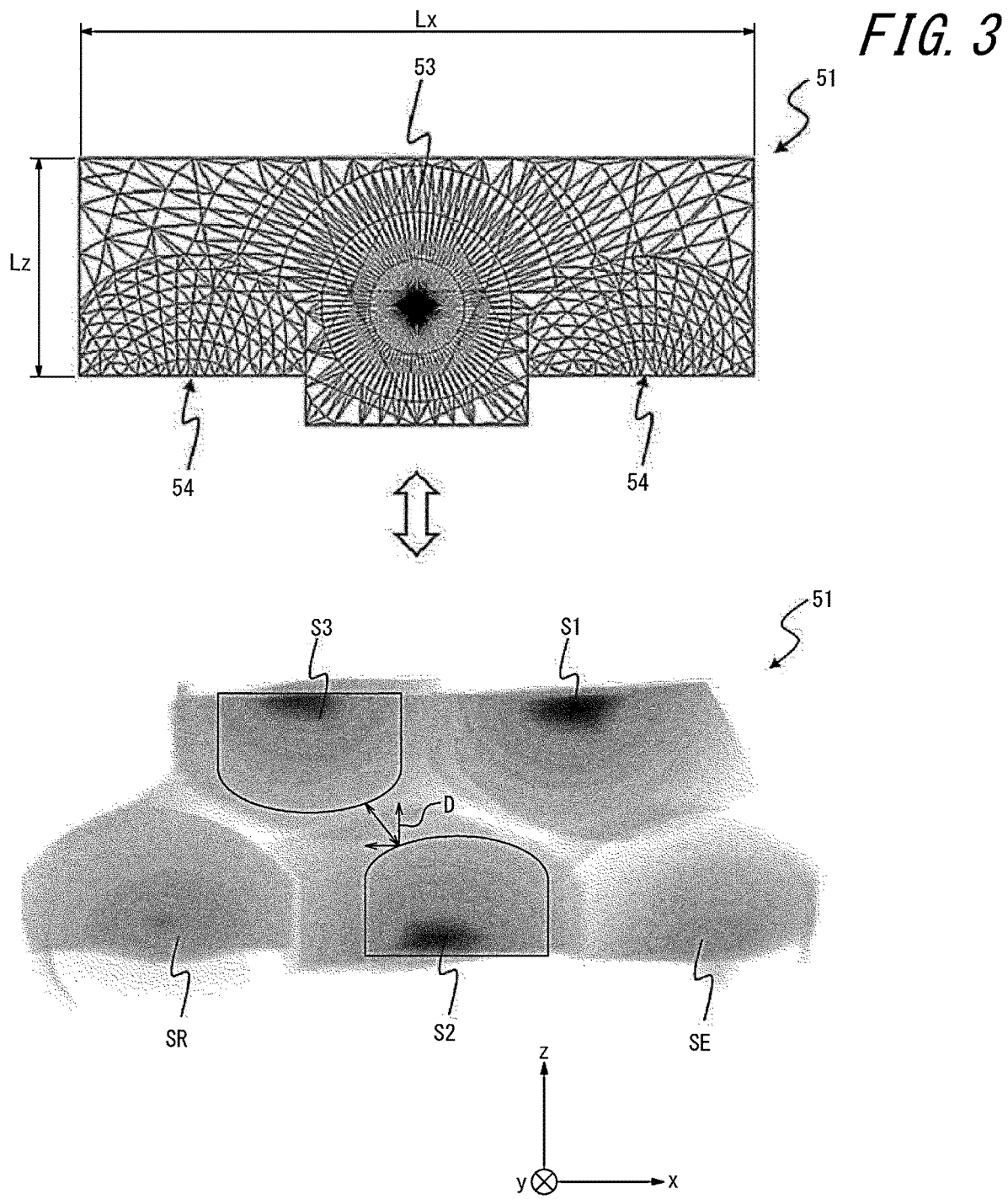
FIG. 3 is a diagram for explanation of light spots on the first reflector.

FIG. 3 is a diagram for explanation of light spots on the first reflector 51. In the optical concentration measuring apparatus 1, the reflective surfaces of the first reflector 51 and the second reflector 52 are designed so that even when the light spots spread somewhat, an overlap between adjacent light spots is 20% or less of the total intensity of each light spot. In other words, by making the main reflective surface 53 of the first reflector 51 a spherical surface, and the secondary reflective surfaces 54 of the first reflector 51 and the reflective surface of the second reflector 52 quadric surfaces, efficient distribution of light spots on a limited area of reflective surfaces becomes possible. Further, a design that eliminates overlap between adjacent light spots and has spacing between each light spot is contrary to optical concentration measuring apparatus size reduction. Accordingly, a distance D between each light spot preferably satisfies D≤Lz/5 or D≤Lx/5, where Lz is length of the first reflector 51 in the z-axis direction and Lx is length of the first reflector 51 in the x-axis direction. The distance D between each light spot more preferably satisfies D≤Lz/10 or D≤Lx/10. The distance D between each light spot is the longer of an x-axis projection component or a z-axis projection component of a line segment that is the shortest distance to a region where light intensity is $1/10$ or more of the maximum intensity in each light spot.

The first reflector 51 is illustrated from a lateral view in FIG. 3. The lateral view is a view of the front of the main reflective surface 53 of the first reflector 51 from the second reflector 52. The viewing direction in the case of the lateral view corresponds to the positive direction of the y-axis. As illustrated in FIG. 3, multiple light spots (S1, S2, and S3) occur on the main reflective surface 53 and are arranged in the horizontal direction and the vertical direction, with centers of light spots not aligned in the vertical direction. That is, multiple rows are each formed by light spots that are adjacent to each other in the horizontal direction, the multiple rows are arranged in the vertical direction, and the centers of light spots in different adjacent rows are all offset from each other in the horizontal direction. Here, the x-axis direction corresponds to the horizontal direction in the lateral view. Further, the vertical direction corresponds to the z-axis direction. Further, the center of each light spot is a position of maximum light intensity in the light spot. In the example in FIG. 3, the light spots (S1, S2, and S3) are arranged not only in the horizontal direction, but also in two rows in the vertical direction. Further, the center of a light spot in the upper row is positioned to be offset in the horizontal direction relative to the center of a light spot in the lower row. Here, the lower row light spots also include a light spot (SE) of the secondary reflective surface 54 on the light emitter 3 side and a light spot (SR) of the secondary reflective surface 54 on the light receiver 4 side. This arrangement of light spots enables a configuration in which many light spots are in a limited area of the reflective surface, while maintaining distances between adjacent light spots so that the overlap with each light spot is small relative to the total intensity of each light spot.

Figure 4:
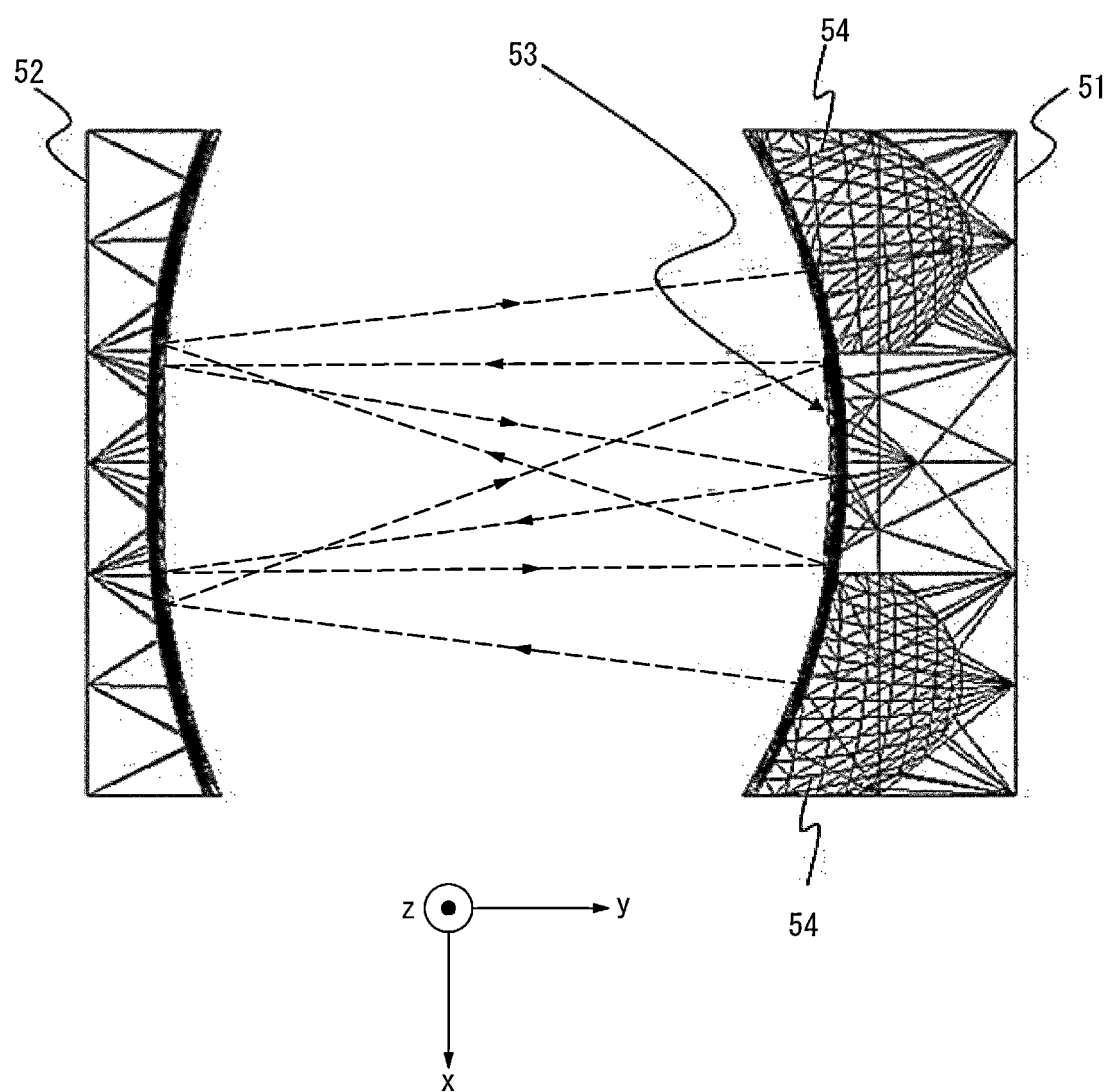
FIG. 4 is a diagram illustrating a case where a total number of optical paths between the first reflector and the second reflector is 8.
Figure 5:
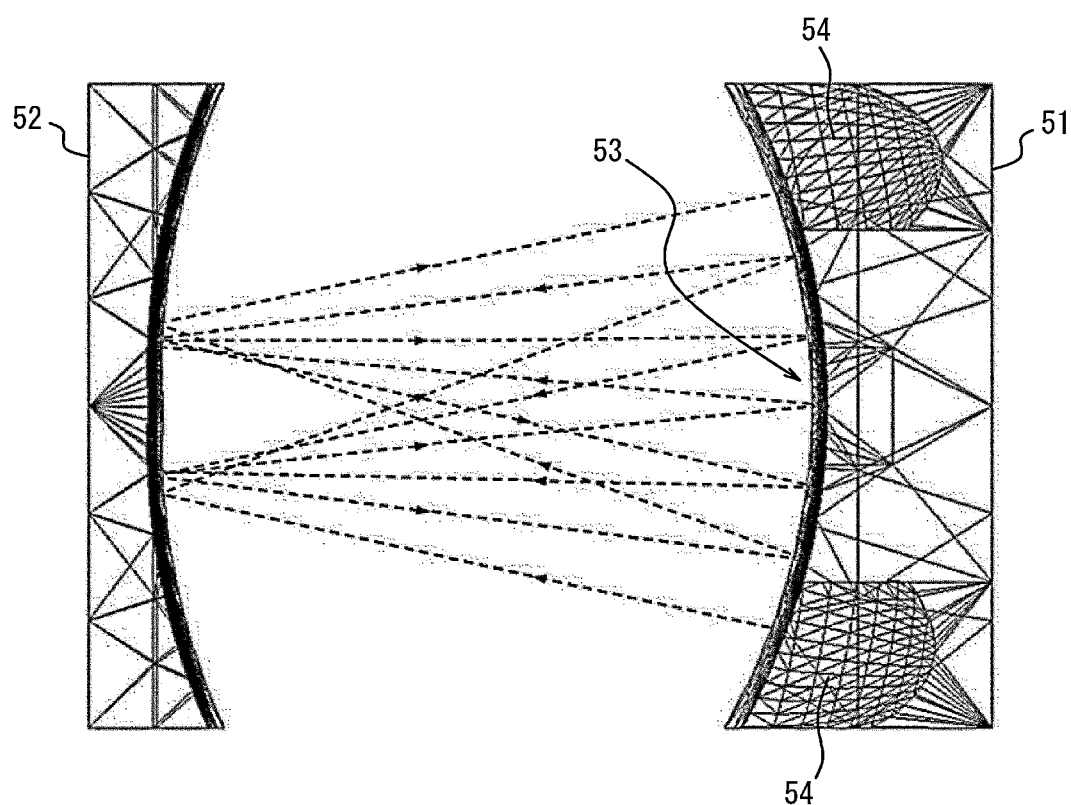
FIG. 5 is a diagram illustrating a case where the total number of optical paths between the first reflector and the second reflector is 12.
Figure 5:
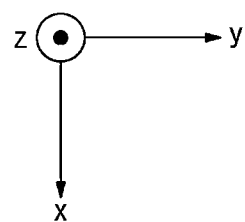
Figure 6:
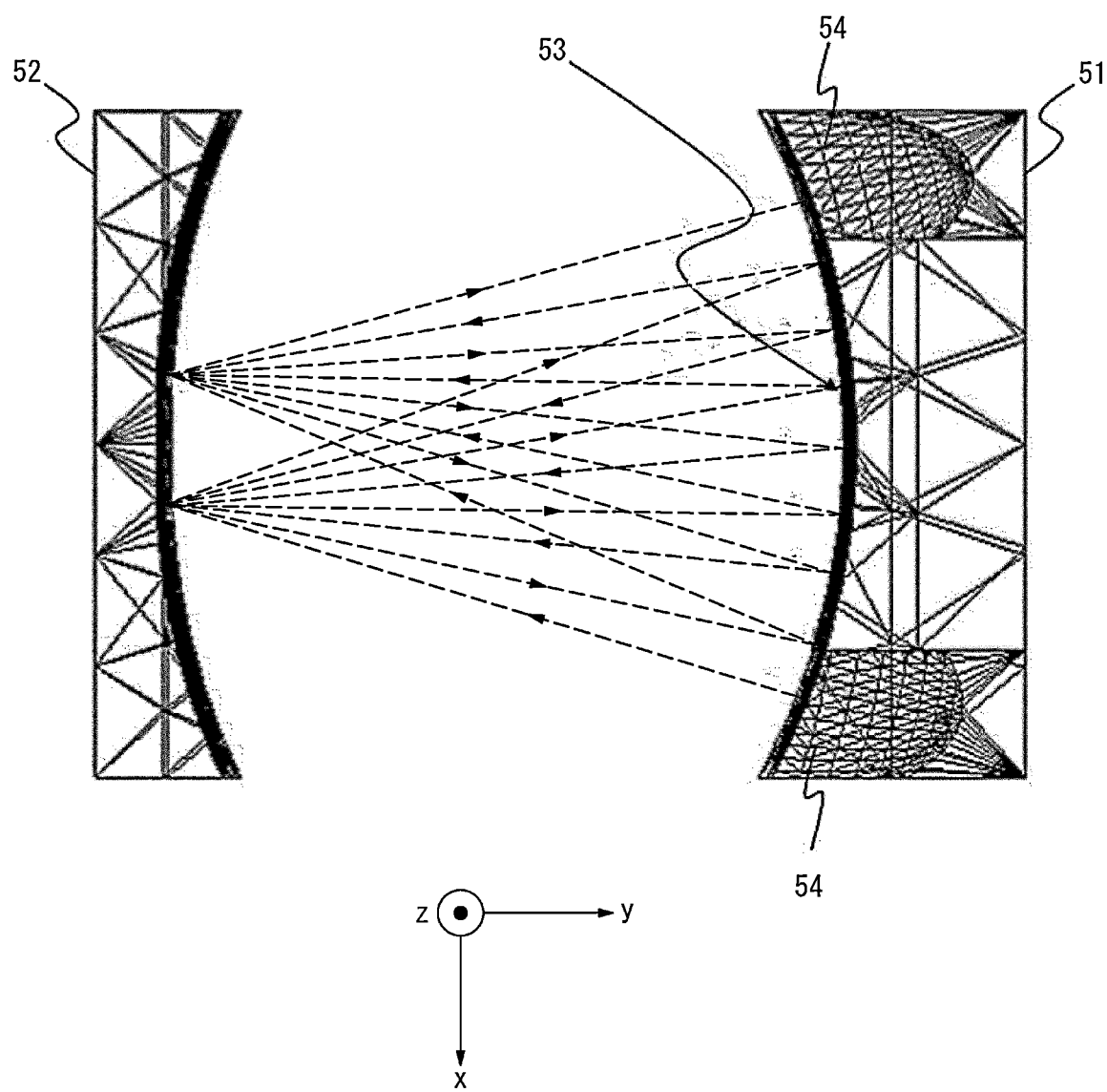
FIG. 6 is a diagram illustrating a case where the total number of optical paths between the first reflector and the second reflector is 16.
Figure 7:
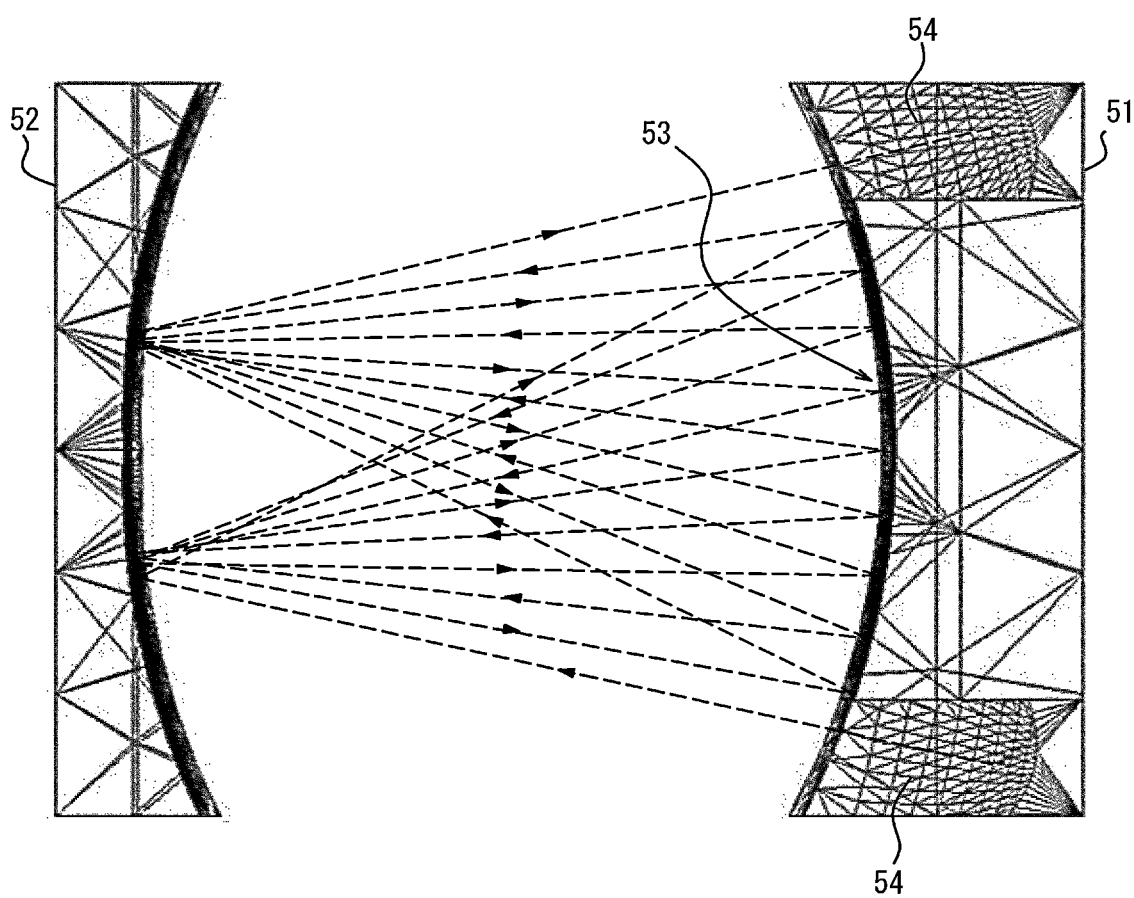
FIG. 7 is a diagram illustrating a case where the total number of optical paths between the first reflector and the second reflector is 20.
Figure 7:
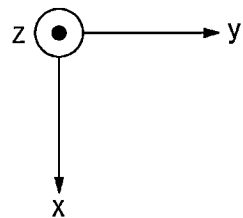

Here, when the total number of optical paths from the first reflector 51 to the second reflector 52 and from the second reflector 52 to the first reflector 51 is N, the number of light spots on the main reflective surface 53 is ((N/2)−1). According to this calculation, one optical path is defined as one traversal straight through the internal space until reflection. The optical concentration measuring apparatus 1 according to the present embodiment is designed such that the total number of optical paths between the first reflector 51 and the second reflector 52 is 8 or more and a multiple of 4. FIG. 4 is a diagram illustrating a case where the total number of optical paths between the first reflector 51 and the second reflector 52 is 8. FIG. 5 is a diagram illustrating a case where the total number of optical paths between the first reflector 51 and the second reflector 52 is 12. FIG. 6 is a diagram illustrating a case where the total number of optical paths between the first reflector 51 and the second reflector 52 is 16. FIG. 7 is a diagram illustrating a case where the total number of optical paths between the first reflector 51 and the second reflector 52 is 20. The light spots (S1, S2 and S3) on the main reflective surface 53 in the example in FIG. 3 correspond to a case where the total number of optical paths between the first reflector 51 and the second reflector 52 is 8. As the total number of optical paths between the first reflector 51 and the second reflector 52 increases, the number of light spots on the main reflective surface 53 also increases. According to the present embodiment, even when the total number of optical paths between the first reflector 51 and the second reflector 52 is 12 or 16, the light spots on the main reflective surface 53 are arranged in the horizontal direction and the vertical direction in the lateral view, and the centers of the light spots are not aligned in the vertical direction. That is, light spots are arranged in high density on the limited area of the reflective surface while the overlap between adjacent light spots is kept small, relative to the total intensity of each light spot. Accordingly, the total number of optical paths between the first reflector 51 and the second reflector 52 may be increased, that is, the optical path length may be further increased, without increasing the size of the optical concentration measuring apparatus 1. In other words, the effect of disturbance may be reduced, and the optical concentration measuring apparatus 1 that is compact and has high measurement accuracy may be realized.

Figure 8:
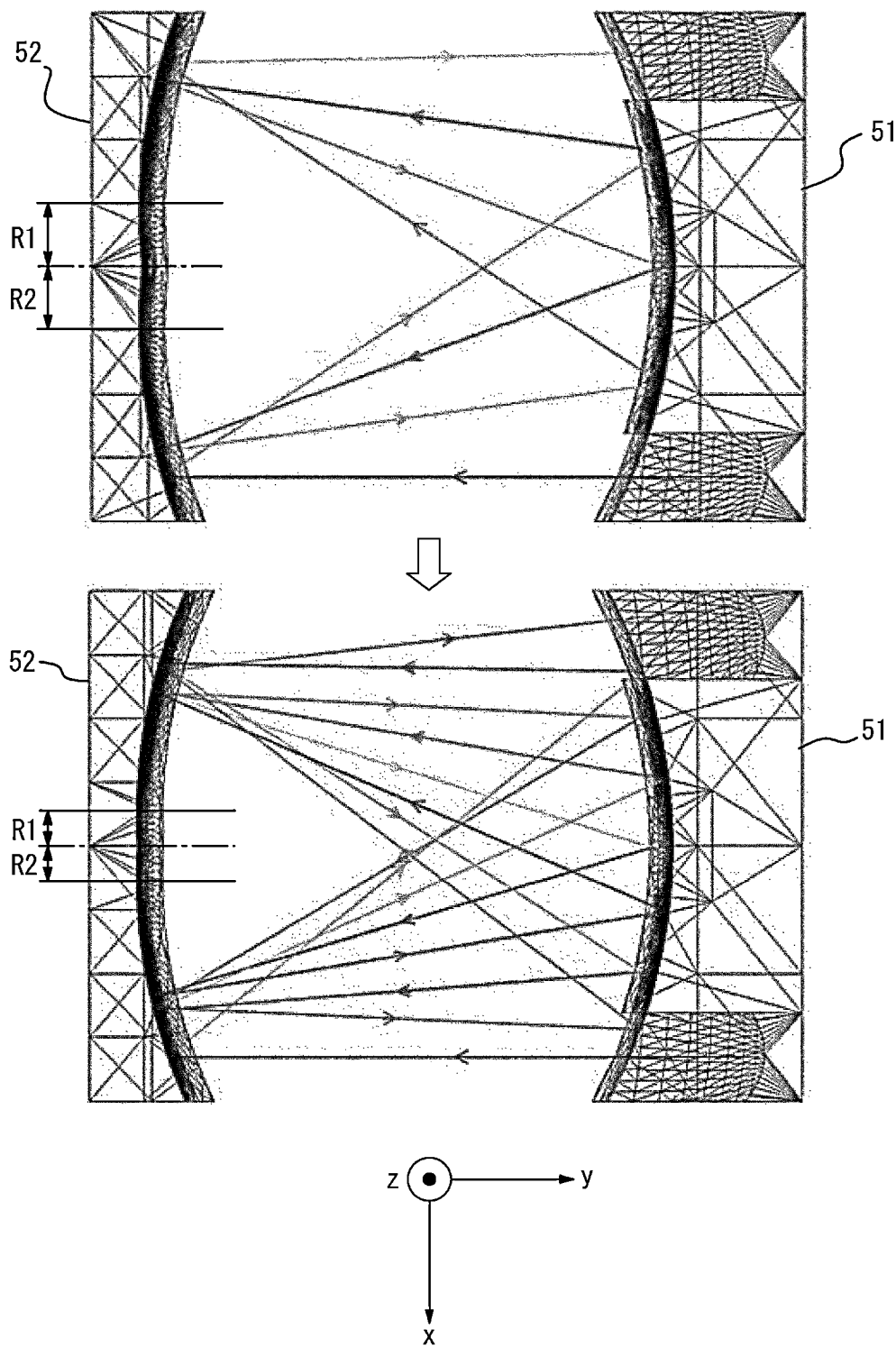
FIG. 8 is a diagram for explanation of a relationship between the most recessed portions of a reflective surface of the second reflector and the total number of optical paths between the first reflector and the second reflector.

FIG. 8 is a diagram for explanation of a relationship between the most recessed portions of the reflective surface of the second reflector 52 and the total number of optical paths (N) between the first reflector 51 and the second reflector 52. FIG. 8 illustrates a simulated optical path diagram, with N=8 in the upper image and N=16 in the lower image. As illustrated in FIG. 8, as the total number of optical paths between the first reflector 51 and the second reflector 52 increases, distances R1 and R2 become smaller. That is, distances between the most recessed portions of the reflective surface of the second reflector 52 and a midpoint between the two most recessed portions become smaller. The most recessed portions of the reflective surface of the second reflector 52 are two points of intersection of a plane parallel to the z-axis with the reflective surface of the second reflector 52, the z-axis being perpendicular to the main surface 20 of the substrate 2. As the total number of optical paths increases, a distance between the two most recessed portions, R1 plus R2, narrows. Finally, the distance R1 plus R2 becomes zero, and the second reflector 52 becomes one quadric surface, which prevents light from traversing between the second reflector 52 and the main reflective surface 53 multiple times. To solve this phenomenon, it becomes necessary to increase the size of the optical concentration measuring apparatus 1 in the width direction (x-axis direction). That is, extending the optical path length may require increasing the size of the optical concentration measuring apparatus 1 in the width direction (x-axis direction). Simulations confirmed that, at least for N=20, extending the optical path length without increasing the size of the optical concentration measuring apparatus 1 is possible.

Figure 9:
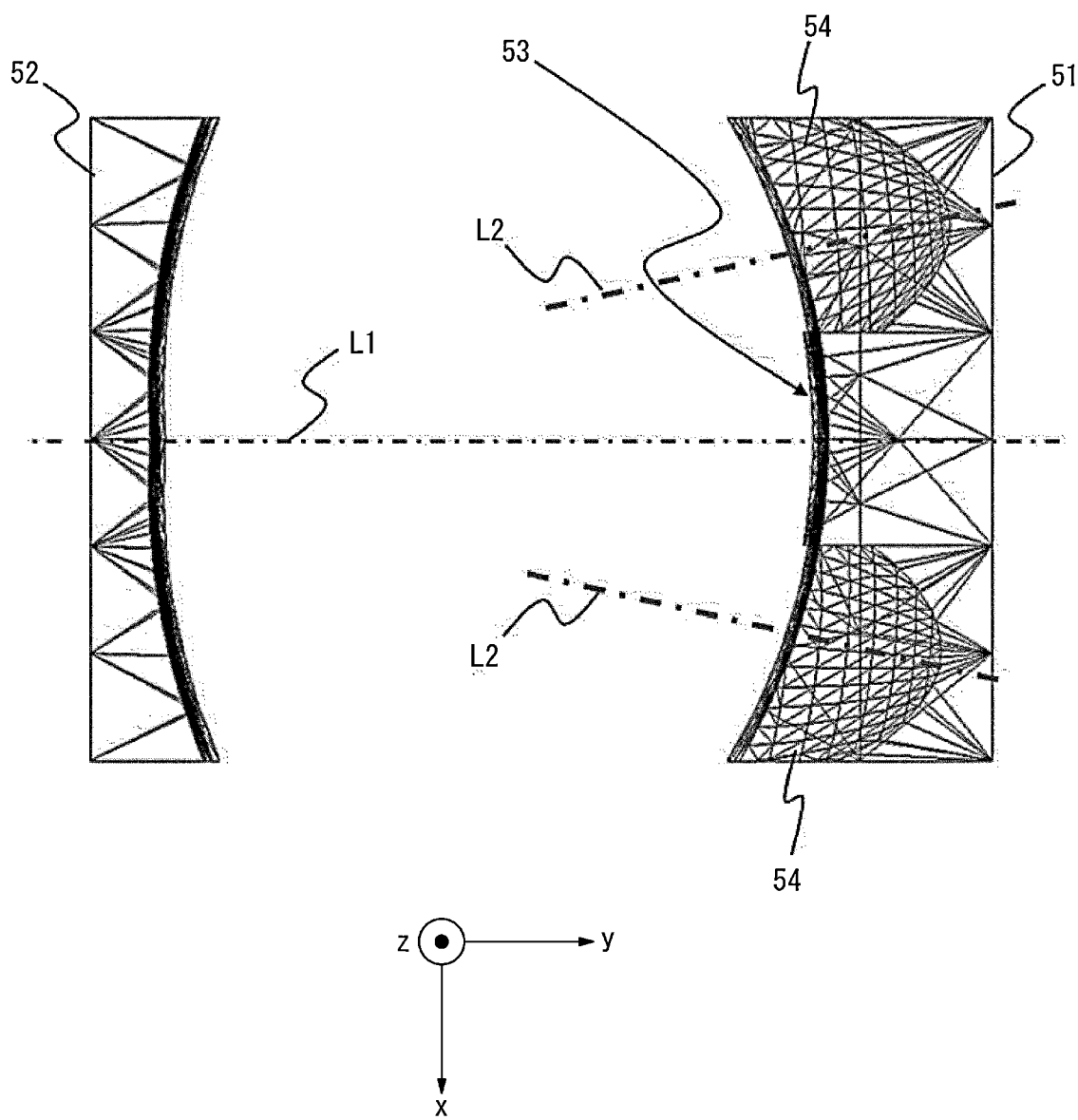
FIG. 9 is a diagram for explanation of a relationship between axes of symmetry of the main reflective surface and secondary reflective surfaces.

FIG. 9 is a diagram for explanation of a relationship between axes of symmetry of the main reflective surface 53 and the secondary reflective surfaces 54. In the overhead view, the optical concentration measuring apparatus 1 is preferably configured such that each of the axes of symmetry (L2) of the two secondary reflective surfaces 54 are not parallel to the axis of symmetry (L1) of the main reflective surface 53. Such a configuration brings the reflection points of light on the second reflector 52 closer to R1 and R2, the most recessed portions of the reflective surfaces of the second reflector 52, than when the axes of symmetry (L2) of the two secondary reflective surfaces 54 are parallel to the axis of symmetry (L1) of the main reflective surface 53. Aberration has a square or cubic relationship to the height of incidence, which is the distance from the most recessed portions of the reflecting surface, and therefore such a configuration may reduce the effect of spherical aberration.

As described above, the optical concentration measuring apparatus 1 according to the present embodiment is compact yet capable of enhancing measurement accuracy through the above configuration.

Although an embodiment has been described based on the drawings and examples, it should be noted that a person skilled in the art may easily make variations and modifications based on the present disclosure. Therefore, it should be noted that such variations and modifications are included within the scope of the present disclosure.

Figure 10:
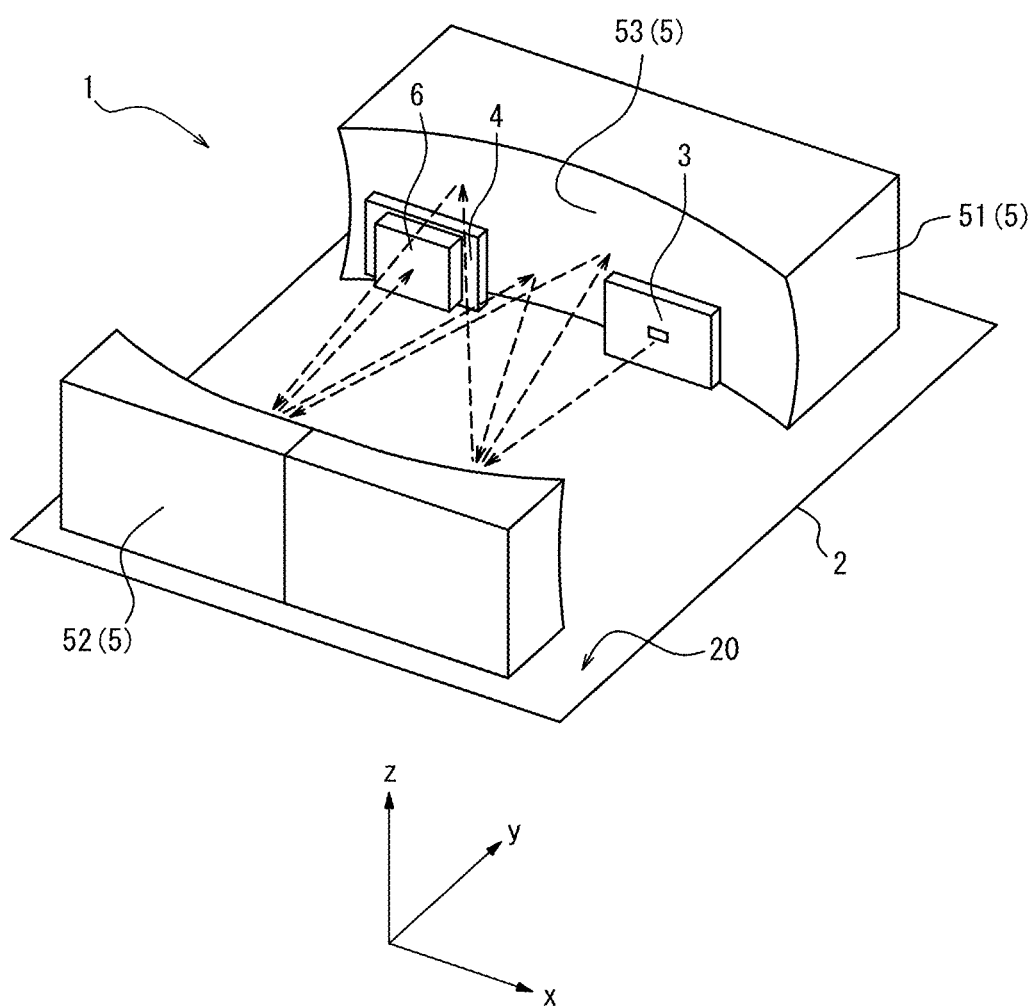
FIG. 10 is a partially transparent perspective diagram of an optical concentration measuring apparatus according to another embodiment of the present disclosure.

For example, as another embodiment, the main reflective surface 53 may be configured without the secondary reflective surfaces 54. For example, FIG. 10 is a partially transparent perspective diagram of the optical concentration measuring apparatus 1 according to another embodiment of the present disclosure. In the example of FIG. 10, the first reflector 51 includes only the main reflective surface 53 that is a quadric surface. Further, the light emitter 3 and the light receiver 4 are disposed opposite the second reflector 52 in the overhead view looking directly at the main surface of the substrate. In the example of FIG. 10, the light emitter 3 and the light receiver 4 are disposed so that the opposite side to the light-emitting surface and the opposite side to the light-receiving surface are opposite the main reflective surface 53, directly emitting and receiving light to and from the second reflector 52 without the secondary reflective surfaces 54. Further, in FIG. 10, the light emitter 3 and the light receiver 4 are disposed internally, surrounded by the first reflector 51 and the second reflector 52. As another configuration, a hole may be provided in a portion of the first reflector 51, and the light emitter 3 and the light receiver 4 may be disposed behind the first reflector 51 (in the y-axis positive direction), and directly emitting and receiving light to and from the second reflector 52, without the secondary reflective surfaces 54.

The invention claimed is:

1. An optical concentration measuring device comprising:
   a light emitter disposed on a main surface of a substrate and configured to emit light from a light-emitting surface;
   a light receiver disposed on the main surface of the substrate and configured to receive the light at a light-receiving surface; and
   a light guide configured to guide the light emitted by the light emitter to the light receiver, wherein
   the light guide comprises a first reflector and a second reflector,
   the first reflector and the second reflector are connected to the main surface of the substrate opposite each other in an overhead view looking directly at the main surface of the substrate,
   the second reflector comprises two quadric surfaces, and
   the first reflector comprises a main reflective surface that is a quadric surface and two secondary reflective surfaces integrally formed at portions of the main reflective surface, where each of the secondary reflective surfaces is a quadric surface.

2. The optical concentration measuring apparatus according to claim 1, wherein
   light spots occur on the main reflective surface in a lateral view looking from the second reflector to the front of the main reflective surface,
   rows are formed by the light spots that are adjacent to each other in a horizontal direction, and the rows are arranged in a vertical direction, and
   centers of the light spots in each adjacent different row of the light spots are all offset from each other in the horizontal direction.

3. The optical concentration measuring apparatus according to claim 1, wherein
   a number of light spots on the main reflective surface is $((N/2)-1)$, where a total number of optical paths from the first reflective surface to the second reflective surface and from the second reflective surface to the first reflective surface is N.

4. The optical concentration measuring apparatus according to claim 3, wherein the total number is 8 or more and a multiple of 4.

5. The optical concentration measuring apparatus according to claim 1, wherein, in the overhead view, each axis of symmetry of the two secondary reflective surfaces is not parallel to an axis of symmetry of the main reflective surface.

6. The optical concentration measuring apparatus according to claim 1, wherein the main reflective surface is a spherical surface.

7. The optical concentration measuring apparatus according to claim 1, wherein
   light spots occur on the main reflective surface in a lateral view looking from the second reflector to the front of the main reflective surface, and
   overlap of the light spots that are adjacent is 20% or less of the total intensity of each light spot.

8. The optical measuring apparatus according to claim 1, wherein light spots occur on the main reflective surface in a vertical direction and a horizontal direction in a lateral view looking from the second reflector to the front of the main reflective surface, and
   a distance D between each light spot satisfies $D \leq Lz/5$ or $D \leq Lx/5$, where Lz is length of the first reflector in the vertical direction and Lx is length of the first reflector in the horizontal direction.

9. An optical concentration measuring apparatus comprising:
   a light emitter configured to emit light from a light-emitting surface;

a light receiver configured to receive the light at a light-receiving surface; and a light guide configured to guide the light emitted by the light emitter to the light receiver, wherein the light guide comprises a first reflector and a second reflector, the first reflector and the second reflector are connected to a main surface of a substrate and are opposite each other in an overhead view looking directly at the main surface of the substrate, the second reflector comprises two quadric surfaces, the first reflector comprises a main reflective surface that is a quadric surface, and the light emitter and the light receiver are disposed opposite the second reflector in an overhead view looking directly at the main surface of the substrate.

* * * * *